United States Patent
Grossheim

(10) Patent No.: US 12,472,960 B2
(45) Date of Patent: Nov. 18, 2025

(54) METHOD OF OPERATING A VEHICLE WITH AT LEAST ONE X-BY-WIRE SYSTEM

(71) Applicant: Robert Bosch GmbH, Stuttgart (DE)

(72) Inventor: Reinhard Grossheim, Abtsgmuend (DE)

(73) Assignee: Robert Bosch GmbH, Stuttgart (DE)

(*) Notice: Subject to any disclaimer, the term of this patent is extended or adjusted under 35 U.S.C. 154(b) by 52 days.

(21) Appl. No.: 18/435,264

(22) Filed: Feb. 7, 2024

(65) Prior Publication Data
US 2024/0270266 A1 Aug. 15, 2024

(30) Foreign Application Priority Data
Feb. 14, 2023 (DE) .............. 10 2023 201 213.8

(51) Int. Cl.
*B60W 50/035* (2012.01)
*B60W 10/04* (2006.01)
*B60W 10/18* (2012.01)
*B60W 10/20* (2006.01)
*B60W 20/50* (2016.01)
*B60W 50/02* (2012.01)
*B60W 60/00* (2020.01)

(52) U.S. Cl.
CPC ......... *B60W 50/035* (2013.01); *B60W 10/04* (2013.01); *B60W 10/18* (2013.01); *B60W 10/20* (2013.01); *B60W 20/50* (2013.01); *B60W 50/02* (2013.01); *B60W 60/0059* (2020.02)

(58) Field of Classification Search
CPC .... B60W 50/035; B60W 10/04; B60W 10/18; B60W 10/20; B60W 20/50; B60W 50/02; B60W 50/029; B60W 60/0059
See application file for complete search history.

(56) References Cited

U.S. PATENT DOCUMENTS

| | | | |
|---|---|---|---|
| 2013/0158755 A1* | 6/2013 | Tang ................ | H01M 10/48 700/29 |
| 2016/0231381 A1* | 8/2016 | Salziger ............ | B60W 20/50 |
| 2022/0363275 A1* | 11/2022 | Ji ...................... | B60W 50/14 |

* cited by examiner

*Primary Examiner* — Jacob M Amick
(74) *Attorney, Agent, or Firm* — Maginot, Moore & Beck LLP

(57) ABSTRACT

A method for operating a vehicle, in particular a motor vehicle, with at least one X-by-wire system, wherein the vehicle is transferred to a safe operating state within a defined period of time in the event of emergency operation, and wherein a predefined tolerance time interval is specified for the emergency operation, during which the emergency operation can be maintained at a maximum, in particular without an unreasonable risk. At least one information signal representing aging and/or wear of the X-by-wire system is determined and a duration of the tolerance time interval is varied dynamically as a function of the information signal.

12 Claims, 2 Drawing Sheets

METHOD OF OPERATING A VEHICLE WITH AT LEAST ONE X-BY-WIRE SYSTEM

This application claims priority under 35 U.S.C. § 119 to application no. DE 10 2023 201 213.8, filed on Feb. 14, 2023 in Germany, the disclosure of which is incorporated herein by reference in its entirety.

The disclosure is based on a method for operating a vehicle, in particular a motor vehicle, with at least one X-by-wire system. The disclosure also relates to a computing unit for carrying out such a method and a vehicle comprising such a computing unit.

BACKGROUND

Motor vehicles with X-by-wire systems, for example in the form of a steer-by-wire steering system, a brake-by-wire braking system and/or a drive-by-wire drive system, are known from the prior art. In order to achieve the necessary safety-relevant availability in such systems, appropriate redundancies are normally used. If the redundancy fails, emergency operating strategies are also provided, for example in accordance with ISO 26262, in order to transfer the vehicle to a safe operating state. For example, a vehicle speed can be limited to a safe value after a defined "Emergency Operation Time" has expired. In this context, a predefined tolerance time interval ("Emergency Operation Tolerance Time Interval") is normally also defined for emergency operation, during which emergency operation can be maintained to the maximum, i.e. without unreasonable risk.

Furthermore, classic vehicle systems are generally designed for a service life of around 15 years. As a result, the predefined tolerance time interval is also based on this service life. Problems can therefore occur if vehicles are operated beyond their defined service life with the initially defined tolerance time interval.

Therefore, the object of the disclosure is in particular to provide a method for operating a vehicle, which provides improved features with respect to operational safety. This object is achieved by the features of the disclosure, while advantageous configurations and further developments of the disclosure can be gathered from the disclosure.

SUMMARY

The disclosure is based on a method, in particular a computer-implemented method, for operating a vehicle, in particular a motor vehicle, with at least one X-by-wire system, wherein the vehicle is transferred to a safe operating state within a defined period of time, in particular automatically and/or autonomously, in the event of emergency operation, and wherein a predefined tolerance time interval is specified for the emergency operation, during which the emergency operation can be maintained to a maximum extent, in particular without an unreasonable risk. In this context, emergency operation can, for example, correspond to a failure of a redundancy of the X-by-Wire system. In addition, the transfer to the safe operating state can be achieved, for example, by limiting and/or restricting the vehicle speed.

It is proposed that at least one information signal representing ageing and/or wear of the X-by-wire system is determined and that a, in particular maximum, duration of the tolerance time interval is varied dynamically as a function of the information signal. In particular, this configuration can increase the operational safety of a vehicle with an X-by-wire system. At the same time, flexible and safe use of a vehicle beyond its specified service life can be achieved.

The vehicle is designed in particular as a motor vehicle and comprises at least one X-by-Wire system, in particular a redundant one. In principle, however, the vehicle can also comprise several, in particular different, X-by-wire systems, wherein each of the X-by-wire systems can provide a corresponding information signal. An "X-by-wire system" is to be understood in particular as a vehicle system in which a driving command, for example at an input unit, is transmitted exclusively electrically to a vehicle actuator, in particular one that is mechanically separate from the input unit. In this context, the X-by-wire system can be designed as a steering system, a braking system and/or a drive system, for example. Furthermore, a computing unit is provided which is intended to carry out the method for operating the vehicle. The term "computing unit" is in particular intended to mean an electrical and/or electronic unit which has an information input, an information processor, and an information output. Advantageously, the computing unit also has at least one processor, at least one operating memory, at least one input and/or output means, at least one operating program, at least one control routine, at least one calculation routine, at least one determination routine, at least one evaluation routine and/or at least one adaptation routine. In particular, the computing unit is intended to determine, in particular by means of the determination routine, at least one information signal of the X-by-wire system representing ageing and/or wear of the X-by-wire system and, in particular by means of the adaptation routine, to dynamically vary a duration of the tolerance time interval as a function of the information signal. In addition, the computing unit can be advantageously designed to transfer the vehicle to a safe operating state within a defined period of time in the event of emergency operation, for example if a redundancy of the X-by-wire system fails, for example by limiting the vehicle speed. For this purpose, the computing unit can have an active connection with the steering system, the braking system and/or the drive system of the vehicle and, in the event of emergency operation, control the steering system, the braking system and/or the drive system autonomously. The computing unit can also be part of an external computer system, for example a server network and/or cloud network. Preferably, however, the computing unit is integrated into a control unit of the vehicle. Furthermore, an "information signal representing ageing and/or wear of the X-by-wire system" is to be understood in particular as a signal and/or information of the X-by-wire system which is correlated with a current age, in particular an age associated with a failure rate, of at least part of the X-by-wire system or with a current age, in particular an age associated with a failure rate, of the entire X-by-wire system. Advantageously, a current age of the part of the X-by-wire system and/or a current age of the entire X-by-wire system can be inferred or a current age of the part of the X-by-wire system and/or a current age of the entire X-by-wire system can be determined at least on the basis of the information signal. In addition, the information signal is different in particular from a status signal representing a health status of the X-by-wire system. Accordingly, different measures and/or reactions are preferably initiated depending on the status signal (if present) and depending on the information signal, which can differ, for example, in the type and/or duration of the measure and/or reaction. In addition, the information signal can be used in particular to take into account a replacement and/or repair of the X-by-wire system and/or a part of the X-by-wire system when adjusting the tolerance time interval. Furthermore, the X-by-wire system is particularly advantageous for providing the information signal and forwarding it to the computing unit. In addition, the tolerance time interval is preferably determined in advance, in particular during the manufacture of the vehicle, as a function of a failure rate, in particular a random failure rate, of the hardware component or components of the X-by-wire system and is advantageously stored in an operating memory of the vehicle and/or the computing unit. The corresponding failure rate can, for example, be based on manual data or determined using different test methods. As a rule, the failure rate describes a so-called bathtub curve with an exponential increase in a final phase or after a certain time, for example after 15 years, due to ageing and/or wear. If the exact progress of the bathtub rim of the bathtub curve is not known, a linearized progress can be used for simplification. The tolerance time interval can, for example, be a so-called "Emergency Operation Tolerance Time interval". In addition, the defined period of time can be an "emergency operation time", for example. The term "intended" is in particular understood to mean specifically programmed, designed, and/or equipped. The phrase "an object being intended for a specific function" is particularly intended to mean that the object fulfills and/or performs this specific function in at least one application and/or operating state.

Furthermore, it is proposed that the duration of the tolerance time interval is fixed in an initial normal operating phase, in particular independently of the information signal, and is only varied dynamically as a function of the information signal after the initial normal operating phase has elapsed. Preferably, the tolerance time interval is only varied in the area of the exponential increase in the bathtub curve or failure rate, while no adjustment is made in the area of the linear part of the bathtub curve or the failure curve and the maximum duration of the tolerance time interval is selected according to the predefined duration. Preferably, the duration of the tolerance time interval is set to 100% in the initial normal operating phase and is reduced after the initial normal operating phase has elapsed, depending on the information signal, until a minimum duration of the tolerance time interval, i.e. a duration at which a minimum tolerance time interval can still be maintained, is reached. The duration of the tolerance time interval can be reduced according to the progress of the bathtub rim of the bathtub curve or, if the exact progress of the bathtub rim is not known, a linearized progress can be used for simplification. The vehicle can then be prevented from restarting or immobilized, for example. Furthermore, the initial normal operating phase has a particularly preferred duration of between 10 and 20 years, especially 15 years. In particular, this allows a refined degradation strategy to be achieved, which is based on the failure rate of the hardware components of the X-by-Wire system and at the same time has a low resource requirement. In addition, operational safety can be increased, particularly if the vehicle is used beyond its specified service life.

A single X-by-wire system could provide several information signals, for example separate information signals for an input unit and a vehicle actuator or for control electronics of a vehicle actuator and an actuator of the vehicle actuator. According to a preferred configuration, however, it is proposed that the information signal represents an overall age and/or operating time state or an overall state of the X-by-Wire system. This saves computing resources in particular.

Preferably, it is further proposed that the information signal comprise or represent an actual age and/or an actual service life and/or an actual period of operation of the X-by-Wire system. In this context, a replacement and/or repair of the X-by-wire system and/or a part of the X-by-wire system can also be advantageously taken into account when adjusting the tolerance time interval. In particular, this increases operational reliability and enables the ageing of the X-by-Wire system to be determined as accurately as possible.

A particularly simple age determination can be achieved in particular if the information signal is determined by comparing a production date of the X-by-Wire system, for example stored in an operating memory of the vehicle, with a current date which can be retrieved via a vehicle bus, for example.

Furthermore, it is proposed that the information signal is provided by the X-by-wire system as a bus signal and is advantageously transmitted to the computing unit via a vehicle bus system. In particular, this enables an advantageous data exchange between the X-by-Wire system and the computing unit.

The method for operating the vehicle, the computing unit and the vehicle are not intended to be limited to the application and embodiment described above. In particular, the method for operating the vehicle, the computing unit and the vehicle can have a number of individual elements, components and units other than a number specified herein in order to fulfill a mode of operation described herein.

BRIEF DESCRIPTION OF THE DRAWINGS

Further advantages will become apparent from the description of the drawings hereinafter. The drawings illustrate one embodiment example of the disclosure.

The drawings show.

DETAILED DESCRIPTION

Figure 1:
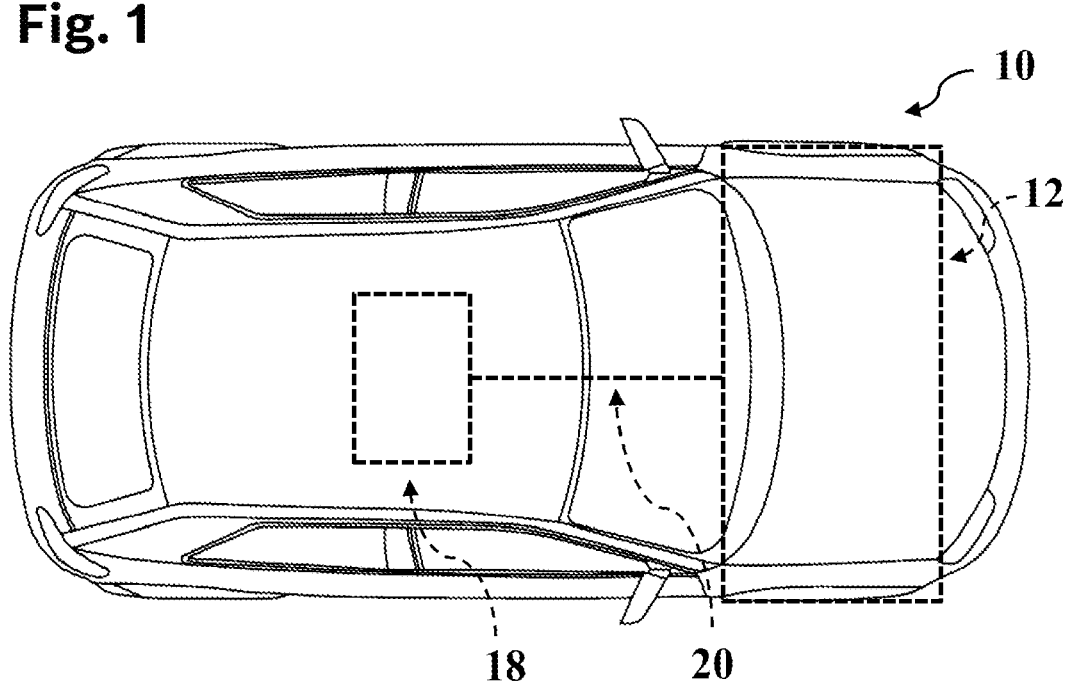
FIG. 1 a vehicle with an exemplary X-by-wire system in a simplified representation, FIG. 2 a diagram of various signals for operating the vehicle and FIG. 3 an exemplary flow chart with main method steps of a method for operating the vehicle.

FIG. 1 shows a schematic representation of an exemplary vehicle 10 designed as a motor vehicle with a redundant X-by-wire system 12. In this context, the X-by-wire system 12 can be designed as a steering system, a braking system and/or a drive system. In the present case, the X-by-wire system 12 is exemplarily designed as a steer-by-wire steering system known per se and comprises an input unit (not shown), which can be actuated in particular by a driver and/or occupant, with a steering handle and a vehicle actuator mechanically separated from the input unit in the form of a wheel steering angle adjuster (not shown). Furthermore, the vehicle 10 has a computing unit 18, for example integrated into a central vehicle control unit, which is used to control the operation of the vehicle 10. The computing unit 18 has an electrical connection to the X-by-wire system 12. In the present case, the computing unit 18 is connected to the X-by-wire system 12 via a vehicle bus system 20. In addition, the computing unit 18 can also be connected in a communicating manner to a brake system (not shown) known per se and/or a drive system (not shown) of the vehicle 10 known per se. In principle, a control unit could also be designed as a steering control unit, a brake control unit or a drive control unit. Furthermore, a computing unit could in principle also be part of an external computer system, for example a server network and/or cloud network. In addition, a vehicle could also comprise several, in particular different, X-by-wire systems.

Classic vehicle systems are generally designed for a service life of around 15 years. Problems can therefore occur if vehicles are operated beyond their defined service life. This applies in particular to vehicles with X-by-wire systems, in which the availability of the X-by-wire system must be ensured at all times due to the mechanical decoupling between the input unit and the vehicle actuators. For this reason, appropriate redundancies and associated emergency operating strategies are normally provided to bring the vehicle into a safe operating state if the redundancy fails.

In order to improve operational safety, in particular when using the vehicle 10 beyond its specified service life, a method for operating the vehicle 10 is proposed below. In the present case, the computing unit 18 is intended to carry out the method and, in particular, has a computer program with corresponding program code means for this purpose.

In the present case, the vehicle 10 is automatically and/or autonomously transferred to a safe operating state within a defined period of time in the event of emergency operation, for example if a redundancy of the X-by-wire system 12 fails, for example by limiting the vehicle speed. A predefined tolerance time interval 14 (see also FIG. 2) is defined for emergency operation, during which emergency operation can be maintained to the maximum, i.e. without an unreasonable risk. The defined period of time can be an "Emergency Operation Time". In addition, the tolerance time interval can be a so-called "Emergency Operation Tolerance Time interval".

The tolerance time interval 14 is normally determined in advance, in particular during manufacture of the vehicle 10, as a function of a random failure rate of the hardware component or hardware components of the X-by-wire system 12 and is advantageously stored in an operating memory (not shown) of the vehicle 10 and/or the computing unit 18. The corresponding failure rate can, for example, be based on manual data or determined using different test methods. As a rule, the failure rate describes a so-called bathtub curve 22 (see also FIG. 2) with an exponential increase in a final phase or after a certain time, for example after 15 years, due to ageing and/or wear. If the exact progress of the bathtub rim is not known, a linearized progress can be used for simplification.

In order to increase operational safety and achieve flexible and safe use of the vehicle 10 beyond its specified service life, an information signal representing ageing and/or wear of the X-by-wire system 12 is determined. In the present case, the information signal is provided directly by the X-by-wire system 12 as a bus signal and transmitted to the computing unit 18 via the vehicle bus system 20. The determined information signal can then be used to dynamically vary a maximum duration of the tolerance time interval 14.

The information signal is different from a status signal representing a health status of the X-by-wire system 12. This means that different measures and/or reactions are initiated depending on the status signal (if present) and depending on the information signal, which can differ, for example, in the type and/or duration of the measure and/or reaction. Accordingly, normal ageing effects and/or wear and tear effects can be treated in a different way than, for example, damage to the X-by-Wire system 12 caused by accidents.

Furthermore, in the present case, the information signal represents an age and/or operating time status of the X-by-Wire system 12, in particular the entire age and/or operating time status. For this purpose, the information signal comprises an actual age and/or an actual service life and/or an actual period of operation of the X-by-Wire system 12. In the present case, the information signal can be determined, for example, by comparing a production date of the X-by-wire system 12, which is stored in particular in an operating memory of the vehicle 10, with a current date, which can be called up via the vehicle bus system 20, for example. This can also take into account a replacement and/or repair of the X-by-Wire system 12 and/or a part of the X-by-Wire system 12.

Figure 2:
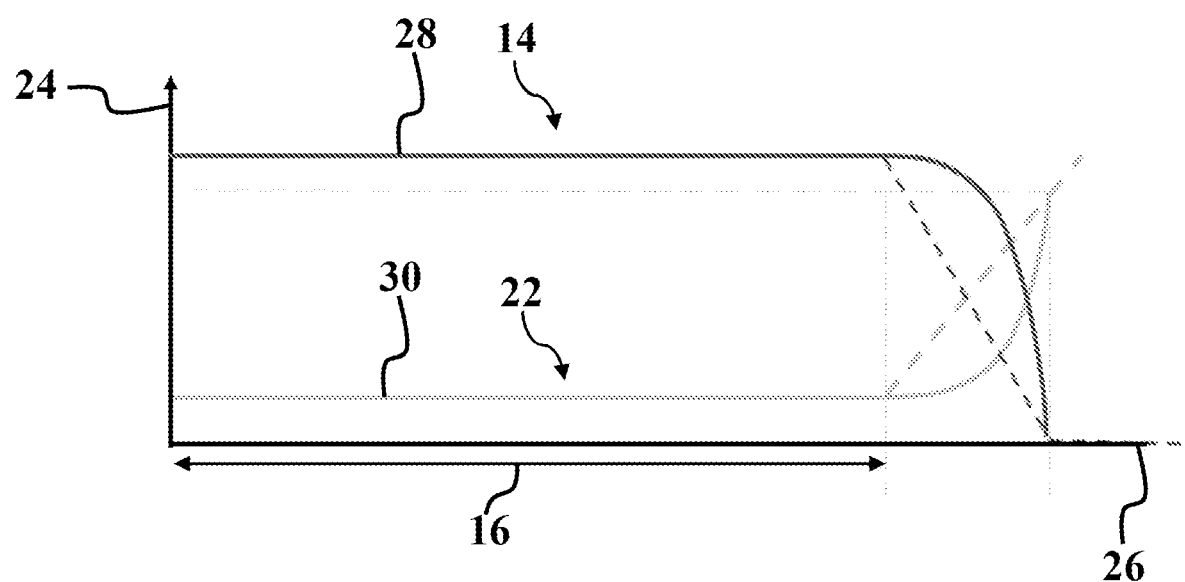

In addition, the duration of the tolerance time interval 14 is fixed in an initial normal operating phase 16, in particular independently of the information signal, and is only varied dynamically after the initial normal operating phase 16 has elapsed as a function of the information signal (see in particular FIG. 2). The initial normal operating phase 16 has a duration of between 10 and 20 years, and preferably around 15 years. In the present case, the tolerance time interval 14 is only varied in the area of the exponential increase in the bathtub curve 22 or the failure rate, while no adjustment is made in the area of the linear portion of the bathtub curve 22 or the failure rate, and the duration of the tolerance time interval 14 is selected to a maximum, for example a few hours, in accordance with the predefined duration. Accordingly, the duration of the tolerance time interval 14 is set to 100% in the initial normal operating phase 16 and is reduced after the initial normal operating phase 16 has elapsed, depending on the information signal, until a minimum duration of the tolerance time interval 14, i.e. a duration at which only a minimum tolerance time interval 14, for example a few minutes, can be maintained, is reached. The duration of the tolerance time interval 14 can also be reduced according to the progress of the bathtub rim of the bathtub curve 22 or, if the exact progress of the bathtub rim is not known, a linearized progress can again be used for simplification (see also FIG. 2). The vehicle 10 can then be prevented from restarting, for example, or the vehicle 10 can be immobilized. In principle, however, the duration of a tolerance time interval in an initial normal operating phase could also be selected variably and, for example, varied dynamically depending on an information signal representing ageing and/or wear of an X-by-wire system.

FIG. 2 shows an exemplary diagram of various signals for operating the vehicle 10.

An ordinate axis 24 is designed as a size axis. A time is displayed on an abscissa axis 26. A curve 28 shows the duration of the tolerance time interval 14 in [%]. A curve 30 shows a schematic progress of the bathtub curve 22 correlated with the failure rate of the hardware component(s) of the X-by-Wire system 12.

FIG. 2 and in particular curve 28 show that the duration of the tolerance time interval 14 in the initial normal operating phase 16, of approximately 15 years, is fixed and only after the initial normal operating phase 16 has expired is it dynamically varied, in particular reduced, depending on the information signal, either according to the progress of the bathtub rim of the bathtub curve 22 or, if the exact progress of the bathtub rim is not known, according to a linear progress. In principle, the duration of the tolerance time interval 14 can also increase again, for example if the X-by-wire system 12 and/or a part of the X-by-wire system 12 is replaced and/or repaired and this replacement or repair is taken into account in the information signal.

Figure 3:
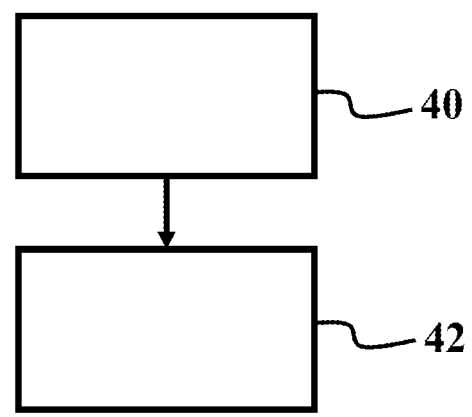

Finally, FIG. 3 shows an exemplary flow chart with the main method steps of a method for operating the vehicle 10.

In a method step 40, in particular after an initial normal operating phase 16 has elapsed, at least one information signal representing ageing and/or wear of the X-by-wire system 12 is determined. The information signal can only be determined after the initial normal operating phase 16 has elapsed. In the present case, the information signal is also provided directly by the X-by-wire system 12 as a bus signal and transmitted to the computing unit 18 via the vehicle bus system 20.

In a method step 42, a duration of the tolerance time interval 14 is dynamically varied as a function of the information signal. In the present case, the duration of the tolerance time interval 14 is reduced as a function of the information signal until a minimum duration of the tolerance time interval 14, i.e. a duration at which only a minimum tolerance time interval 14 can be maintained, is reached. The duration of the tolerance time interval 14 is reduced either according to the progress of the bathtub rim of the bathtub curve 22 or, if the exact progress of the bathtub rim is not known, according to a linear progress.

The flow chart in FIG. 3 is only intended to describe an exemplary method for operating the vehicle 10. In particular, individual method steps can also vary, or additional method steps can be added. In this context, it is conceivable, for example, to select a fixed or variable duration of the tolerance time interval 14 in an initial normal operating phase 16.

What is claimed is:

1. A method for operating a motor vehicle having at least one X-by-wire system, the method comprising:
   determining at least one information signal representing aging and/or wear of the at least one X-by-wire system;
   dynamically varying a duration of a tolerance time interval for an emergency operation as a function of the at least one information signal, the tolerance time interval being a duration of time during which the emergency operation can be maintained at a maximum without exceeding a threshold risk; and
   transferring the motor vehicle to a safe operating state within a defined period of time in an event of the emergency operation.

2. The method according to claim 1, wherein the tolerance time interval is determined in advance as a function of a failure rate of the hardware components of the at least one X-by-wire system.

3. The method according to claim 1, wherein the duration of the tolerance time interval is fixedly selected in an initial normal operating phase and is varied dynamically as a function of the at least one information signal after an initial normal operating phase has elapsed.

4. The method according to claim 3, wherein the duration of the tolerance time interval is set to 100% in the initial normal operating phase and, after the initial normal operating phase has elapsed, is reduced as a function of the at least one information signal until a minimum duration of the tolerance time interval is reached.

5. The method according to claim 3, wherein the initial normal operating phase has a duration of between 10 and 20 years.

6. The method according to claim 1, wherein the at least one information signal maps an entire age and/or operating time state of the at least one X-by-wire system.

7. The method according to claim 1, wherein the at least one information signal comprises an actual age and/or an actual service life and/or an actual duration of operation of the at least one X-by-Wire system.

8. The method according to claim 1, wherein the at least one information signal is determined by comparing a production date of the at least one X-by-wire system with a current date.

9. The method according to claim 1, wherein the at least one information signal is provided by the at least one X-by-wire system as a bus signal.

10. A computing unit configured to carry out the method according to claim 1.

11. A motor vehicle, having the at least one X-by-wire system and having a computing unit configured to carry out the method according to claim 1.

12. The motor vehicle according to claim 11, wherein the at least one X-by-wire system is designed as a steering system, a braking system and/or a drive system.

* * * * *